ROBERT ADLER
*INVENTOR.*

BY John J. Pederson
HIS ATTORNEY.

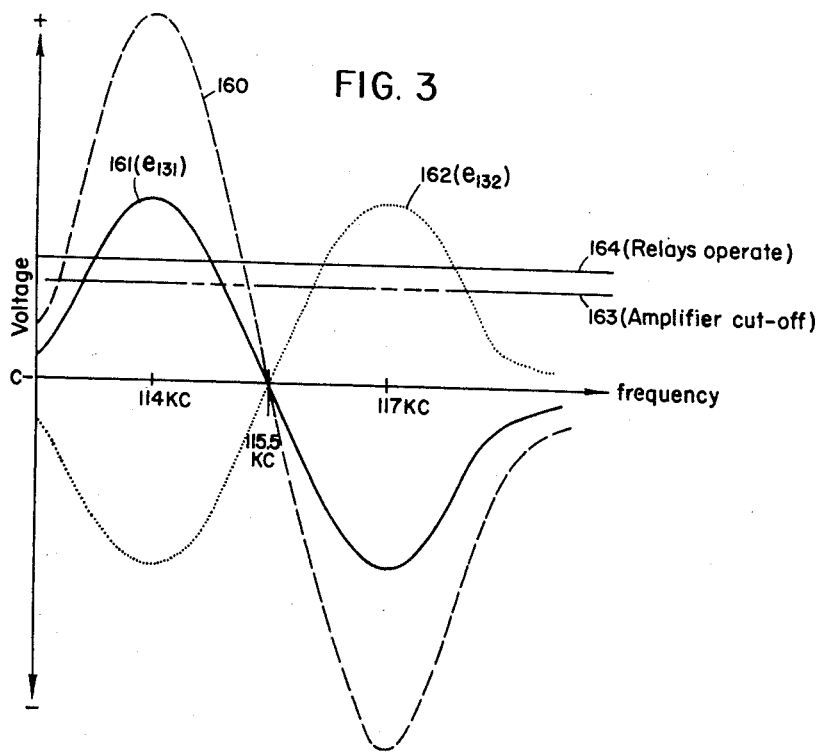
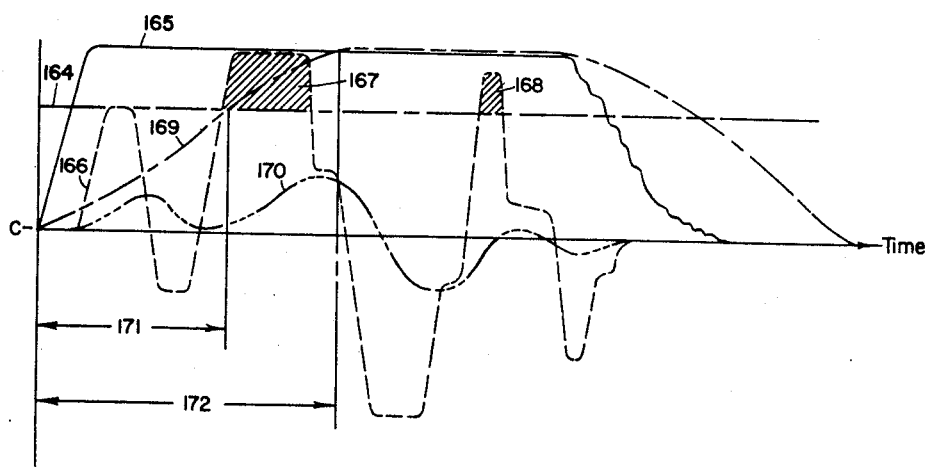

Feb. 2, 1960  R. ADLER  2,923,918
REMOTE CONTROL SYSTEM
Original Filed April 16, 1956  5 Sheets-Sheet 4

ROBERT ADLER
*INVENTOR.*

BY John J. Pederson
HIS ATTORNEY.

Feb. 2, 1960 R. ADLER 2,923,918
REMOTE CONTROL SYSTEM
Original Filed April 16, 1956 5 Sheets-Sheet 5

ROBERT ADLER
*INVENTOR.*

BY John J. Pederson
HIS ATTORNEY.

United States Patent Office 2,923,918
Patented Feb. 2, 1960

2,923,918

REMOTE CONTROL SYSTEM

Robert Adler, Northfield, Ill., assignor to Zenith Radio Corporation, a corporation of Delaware Original application April 16, 1956, Serial No. 578,333, now Patent No. 2,821,954, dated February 4, 1958. Divided and this application October 30, 1957, Serial No. 693,313

3 Claims. (Cl. 340—171)

This invention is directed to a new and improved remote control system for controlling operation of an electrical circuit. The system is particularly valuable when applied to control of one or more electrical circuits in a wave-signal receiver such as a television receiver, and is described in that connection; it is not, however, restricted to this particular use, but may be employed in controlling apparatus in a wide variety of applications. The present application is a division of the co-pending application of Robert Adler, Serial No. 578,333, filed April 16, 1956, for Control System, now U.S. Patent No. 2,821,954, issued February 4, 1958, and assigned to the same assignee as the present application.

There are many different types of electrical or electrically-controlled apparatus for which convenience and efficiency of operation may be greatly enhanced by a remote control system. For example, a television receiver is best utilized when the observer is seated at a substantial distance from the receiver, thus making it relatively inconvenient to change the station or signal channel to which the receiver is tuned when a change in programs is desired, to change the amplitude of sound from the receiver, to turn the receiver on and off, etc. Accordingly, it is highly desirable to provide a system to regulate the receiver operation without requiring the observer to leave the normal viewing position. Similarly, it is frequently desirable to provide for remote control of doors, as on a garage, of heating apparatus, such as a furnace, and of other similar electrical or electrically-controlled devices. In many of these applications, it is undesirable to have a direct cable connection from the remote control station to the controlled device, since a wire or cable link is not particularly attractive in appearance and may often cause accidents when extended transversely of an area where people must walk.

Remote control systems in which operating characteristics of a radio or television receiver or other device are varied in response to radio, acoustic, or light signals have been employed in the past. Those systems which utilize a portable miniature radio transmitter have generally been unsatisfactory in that the control system may be triggered to change the operating characteristics of the controlled device by signals emanating from sources other than the control transmitter. Radio-linked remote control systems frequently create objectionable interference in other wave-signal receivers; they also tend to be relatively complex and expensive to manufacture and require batteries or some other source of electrical power at the transmitter.

Light impulse actuated systems are generally effective in operation, but frequently are relatively expensive, particularly where a number of different electrical circuits are to be controlled, since the photo-sensitive devices employed at the receiving station of the system are relatively costly. Systems of this type are also sometimes subject to false actuation under adverse ambient lighting conditions.

Acoustic control systems, using signals in both the audible and ultra-sonic ranges, have been proposed many times but have not found general acceptance. This lack of acceptance is generally attributable to the fact that the amplitude of the signal received at the pick-up station of the system varies substantially as the distance between the transmitting and pick-up stations is changed. This factor tends to make a control system based upon amplitude modulation of an acoustic carrier quite erratic in operation. In addition, systems of this type are quite frequently subject to false triggering from extraneous acoustic signals. When it is desired to remotely control a plurality of functions of an apparatus, the aforementioned difficulties are not only proportionally multiplied but additional difficulties arise from the need to discriminate one control signal from another while yet providing a system in which a maximum number of the components thereof are common to the performance of all the different control functions in order to achieve the greatest economy of cost and space.

It is a principal object of this invention, therefore, to provide a new and improved plural-function remotely-actuated control system for an electrical or electrically-controlled device which overcomes the above-noted disadvantages of prior art arrangements.

It is a corollary object of the invention to provide a new and improved plural-function remote control system for a wave-signal receiver or similar device which may be easily incorporated in that device without substantially modifying its basic construction.

It is a further object of the invention to provide a new and improved plural-function remote control system of simple and inexpensive construction, wherein a large proportion of the various components may be common to all the different control functions.

Accordingly, the invention is directed to a remote control system for selectively initiating either one of a pair of different control functions of an apparatus. The system includes a control signal receiver coupled to the apparatus and responsive to either one of a pair of airborne ultrasonic compressional-wave signals each of a different frequency for developing one of a corresponding pair of individual electrical signals; means coupled to the receiver means are responsive to the individual electrical signals for initiating the respective control functions of the apparatus. A frequency-discriminating rectifier-detector is included within the receiver means and has a signal response characteristic including a pair of distinct frequency peaks individually harmonically related to the respective different frequencies. Finally, a remotely located transmitter comprises a pair of elongated longitudinal-mode vibrators each having a different physical length respectively equal to one-half wavelength in the vibrator at a different one of the frequencies; the transmitter includes manually operable means for selectively exciting the vibrators into longitudinal-mode vibration.

The features of the invention which are believed to be new are set forth with particularity in the appended claims. The invention, together with further objects and advantages thereof, may best be understood, however, by reference to the following description taken in conjunction with the accompanying drawings, in which:

Figure 3 is an explanatory diagram showing certain operating characteristics for the frequency-discriminator circuit of Figure 2;

Figure 4 is an explanatory diagram illustrating operation of integrating circuits in the embodiment of Figure 2;

Figure 1:
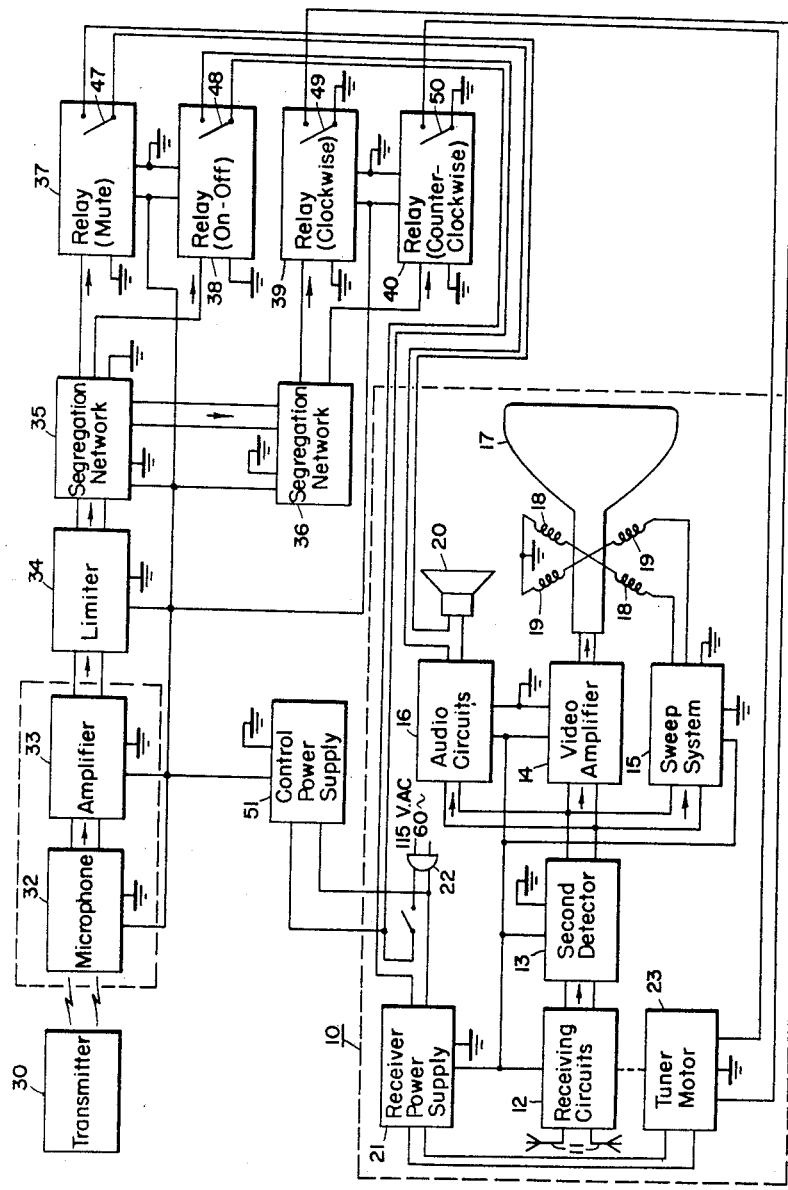
Figure 1 is a block diagram of a remote control system constructed in accordance with the invention and also shows, in very simplified form, a television receiver controlled by the invention.

In Figure 1, a conventional television receiver 10 is shown in simplified block diagram form as an example of the type of electrical and/or electrically-controlled apparatus which may be regulated by remote control systems constructed in accordance with the invention. Receiver 10 includes an antenna 11 coupled to a receiving circuit unit 12; receiving circuits 12 may include the usual radio-frequency amplifier, station selector, first detector and intermediate-frequency amplifier stages found in most conventional receivers. Receiving circuits 12 are coupled to a second detector 13 which, in turn, is coupled to a video amplifier 14, to a sweep system 15, and to the usual audio circuits 16. The output of video amplifier 14 is coupled to the electron gun of a cathode-ray image reproducer 17. The output of sweep system 15 is coupled to the deflection yoke of the picture tube, here illustrated schematically by coils 18 and 19. Audio circuits 16 are coupled through a relay 37 to the usual loudspeaker 20. The operating circuits of the receiver are provided with the necessary operating potentials from a receiver power supply 21 which is energized from an ordinary 115 volt 60 cycle source as indicated by the power input plug 22. A tuner motor 23 is mechanically connected to the station-selection section of receiving circuits 12 to permit remote control of this stage of the receiver, as explained in greater detail hereinafter.

The construction and operation of television receiver 10 is entirely conventional and may be varied as desired without having any effect upon the invention; accordingly, only an extremely brief description of its operation is included here. A television signal is intercepted at antenna 11 and suitably amplified and detected in receiving circuits 12 to develop an intermediate-frequency signal which is supplied to a second detector 13. The second detector develops a composite video signal which is supplied to video amplifier 14, sweep system 15, and audio circuit 16. The video information portions of the signal are utilized to control the intensity of an electron beam developed in picture tube 17, whereas the synchronizing signals are employed to control deflection of the beam across the image screen of the picture tube under the influence of the sweep signals developed in system 15 and applied to deflection yoke 18, 19. The audio portion of the composite video signal is suitably detected in circuit 16 and employed to energize loudspeaker 20.

It will be recognized by those skilled in the art that many changes may be made in the construction of receiver 10 without departing from conventional practice. For example, the information signal input for audio circuit 16 may be derived from the output stage of video amplifier 14 rather than from second detector 13; the same change may be made in the signal input circuit for sweep system 15. Then too, an electrostatic deflection system may be employed for image reproducer 17. None of these or the many other possible changes, however, have any substantial effect upon the structure and operation of the remote control system schematically illustrated in Figure 1.

The remote control system of Figure 1 comprises a transmitter 30 which develops four ultrasonic acoustic signals of predetermined minimum amplitude and duration within four distinct restricted non-overlapping frequency ranges. The structure and operation of a preferred transmitter device are described hereinafter in detail in connection with Figure 5. Transmitter 30 constitutes the remote or portable portion of the control system; the remainder of the apparatus illustrated in Figure 1 is preferably located closely adjacent to receiver 10 and may be constructed as an integral part of the receiver. The stationary or receiving section of the control system comprises an input circuit 31 including a microphone 32 coupled to a suitable amplifier 33 of any desired number of stages. Amplifier 33 is in turn connected to a limiter circuit 34, the output stage of the limiter being coupled to a pair of series-connected segregation networks 35 and 36. Segregation network 35 is connected to two relays 37 and 38; network 36 is similarly coupled to a pair of relays 39 and 40.

Relay 37 includes a switch 47 which is connected in series with one of the input leads for loudspeaker 20. Relay 38 comprises a switch 48 connected in series with one of the power leads between power-connection plug 22 and receiver power supply 21. Relays 39 and 40 include switches 49 and 50 respectively which are incorporated in the energizing circuits of tuner motor 23. The remote control system also includes a power supply 51 having an input circuit connected across the leads from power input plug 22; control power supply 51 is suitably connected to each of circuits 32—36 and to relays 37—40.

As indicated above, the control system is actuated by ultrasonic signals radiated from transmitter 30; for example, in a given instance transmitter 30 may develop a signal having a frequency of approximately 40 kilocycles. Generally speaking, the transmitter comprises a simple acoustic resonator which is shock-excited to produce a signal; consequently, the signal is not of constant amplitude but decays exponentially as time progresses. To assist in explaining operation of the control system, it may be assumed that the time constant of the resonator output signal amplitude is of the order of 0.3 second.

The ultrasonic signal radiated from transmitter 30 impinges upon microphone 32; as a consequence, the input circuit comprising microphone 32 and amplifier 33 generates an electrical input signal having a frequency representative of the received acoustic signal. In the preferred embodiment to be described in greater detail hereinafter in conjunction with Figure 2, the frequency of the input signal generated in input circuit 31 is equal to that of the received ultrasonic signal; however, in some applications it may be desirable to employ a heterodyning device in the input circuit, in which case the frequency of the electrical input signal is determined by but not necessarily equal to that of the received acoustic signal.

The electrical input signal developed in circuit 31 is applied to limiter 34, which generates an amplitude-limited signal having a frequency equal to an integral multiple of the aforementioned electrical input signal frequency. In this connection, it should be noted that the term "integral multiple," as used throughout this specification and in the appended claims, refers to multiplication by an integer, including unity. Preferably, the amplitude-limited signal appearing at the output of limiter 34 represents a low odd harmonic of the electrical input signal such as the third or fifth harmonic. The amplitude-limited signal developed in limiter 34 is applied to segregation networks 35 and 36, which distinguish the desired amplitude-limited signal from extraneous signals, both within and without the frequency band of the actuating signal, which may appear in the output from limiter 34. In the embodiment of Figure 1, four individual circuits in receiver 10 are regulated by the remote control system; consequently, it is necessary to provide means in transmitter 30 to develop four distinctive ultrasonic actuating signals. Segregation of functions is provided on a frequency basis; thus, in the illustrated control system, transmitter 30 includes means for generating acoustic signals at four different frequencies. For example, the frequencies employed may be 38, 39, 40 and 41 kcs.

Segregation networks 35 and 36 are constructed to develop control signals only in response to signals of predetermined minimum duration and duty cycle within restricted frequency bands respectively including the selected operating frequencies. The received signals are distinguished from each other in networks 35 and 36 strictly on a frequency basis.

In order to avoid triggering of the control system from extraneous acoustic, electrical, or magnetic signals or stray fields, it is also necessary that segregation circuits 35 and 36 be able to analyze the received signal on the basis of duration and duty cycle. For this reason, the two devices each include an integrating system for averaging the signal received from limiter 31 over an extended period of time somewhat shorter than the time constant of transmitter 30. The integrated signal is then applied to a threshold device which remains inoperative except during intervals when the integrated signal exceeds a preselected minimum value. Consequently, a received signal within the same frequency range as the acoustic actuating signal but of substantially shorter duration does not result in generation of a control signal in the output stages of networks 35 and 36. By the same token, an intermittent signal within the acoustic frequency range of the system cannot trigger it into operation in most instances, depending upon the minimum operating level selected for the threshold devices in the segregation circuits. Of course, the receiver system can be falsely triggered by a received signal of relative constant amplitude within the acoustic frequency range of the system; however, this is not likely to occur in most locations.

When the received signal is in the proper frequency range and meets the system requirements with respect to duration and duty cycle, relay 37, for example, may be actuated. A ratchet or step-type relay is employed for relay 37 so that the audio system of receiver 10 may be alternately energized and muted by successive actuations of the relay. Accordingly, when the sound output from speaker 20 exceeds the level of comfort or when silence is momentarily desired, transmitter 30 may be actuated to emit the necessary ultrasonic signal to operate relay 37 and open the audio input circuit to speaker 20; upon the next actuation of relay 37, audio operation is restored. A similar step-type or ratchet relay is employed as relay 38, which serves to energize or de-energize receiver 10 completely. Of course, the signal from transmitter 30 employed to actuate relay 39 is at a different frequency from that utilized in operating relay 37, the two different actuating signals being distinguished from each other on a frequency basis by circuits 35 and 36.

Operation of the tuner control relays 39 and 40 is essentially similar to that of relays 37 and 38 except that the motor-control relays are preferably of the instantaneous-contact type. In the illustrated system, a reversible motor is employed; switch 49 of relay 39 is connected in the motor-energizing circuit employed for clockwise rotation, whereas switch 50 of relay 40 is connected in the energizing circuit utilized for counter-clockwise rotation. An acoustic signal having a frequency different from those used for control of relays 37 and 38 is employed to actuate relay 39, and an acoustic signal of a fourth distinctive frequency actuates relay 40. The motor-control circuits are essentially similar to those long used in the art in connection with other types of remote control systems and consequently are not described in detail in this specification.

Figure 2:
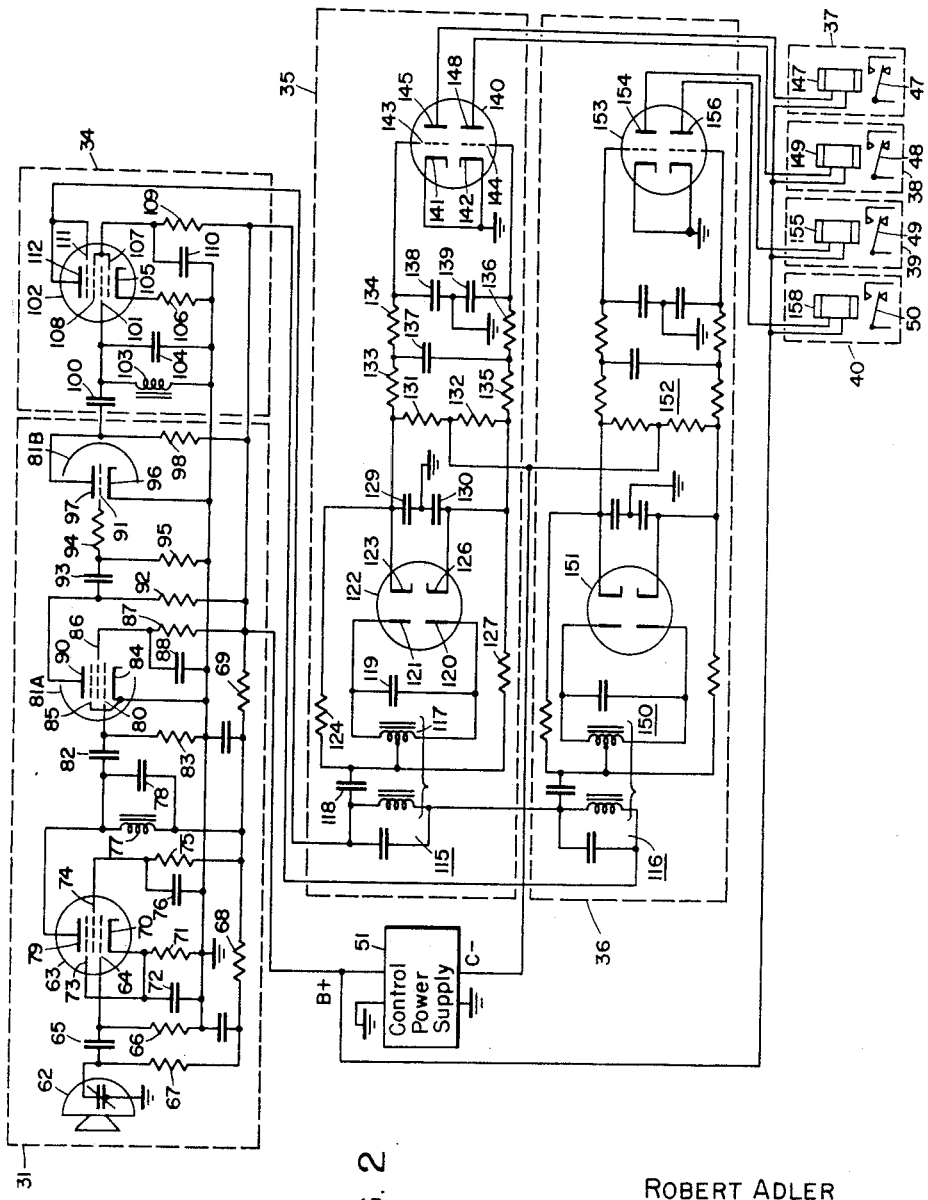
Figure 2 is a detailed schematic diagram of the receiver circuitry for a preferred embodiment of a remote control system constructed in accordance with the invention.

Figure 2 is a detailed schematic diagram of a preferred embodiment of the invention comprising a microphone 62 of the variable-capacitance type; one terminal of the microphone is grounded and the other is coupled to the control electrode 64 of a first amplifier tube such as a pentode 63 by means of an RC coupling circuit comprising a series capacitor 65 and further comprising a shunt resistor 66 connected between electrode 64 and ground.

The microphone circuit also includes three series-connected resistors 67, 68 and 69 which connect microphone 62 back to the positive or B+ terminal of the control power supply 51. Cathode 70 of amplifier tube 63 is connected to ground through a bias resistor 71 which is bypassed by a capacitor 72. The suppressor electrode 73 of the tube is connected directly to the cathode, and the screen electrode 74 is connected to the B+ supply through a resistor 75, the screen being by-passed to ground through a capacitor 76.

The output circuit for tube 63 comprises a parallel-resonant circuit including an inductance 77 and a capacitor 78; the tuned circuit is connected in series between the anode 79 of tube 63 and the B+ supply. Anode 79 is also coupled to the control electrode 80 of the pentode section 81A of a combined pentode-triode by means of an RC coupling circuit comprising a series coupling capacitor 82 and a self-biasing resistor 83 which connects control electrode 80 to ground. Tube section 81A forms a part of the second stage of the input amplifier of the system and includes a cathode 84 which is connected directly to ground, the suppressor electrode 85 in this amplifier stage being connected directly to the cathode. The screen electrode 86 is coupled to a conventional biasing circuit comprising a resistor 87 which connects the screen electrode to the B+ supply and a capacitor 88 bypassing the screen electrode to ground.

The output circuit for amplifier section 81A is a conventional RC coupling circuit which couples the anode 90 of tube section 81A to the control electrode 91 of a triode tube section 81B. The coupling circuit includes a load resistor 92 connecting anode 90 to B+, a capacitor 93 and a resistor 94 connected in series between anode 90 and control electrode 91, and a coupling resistor 95 connecting the terminal of capacitor 93 opposite anode 90 to ground. Triode section 81B comprises the third and final stage of the input amplifier of the system and includes a cathode 96 which is connected to ground and an anode 97 connected to B+ through a load resistor 98. Accordingly, the circuit as thus far described corresponds directly to the input circuit 31 of Figure 1.

In the embodiment of Figure 2, input circuit 31 is coupled to a limiter circuit 34 by a coupling capacitor 100 connected in series between anode 97 of tube section 81B and the control electrode 101 of a limiter tube 102; the input circuit for tube 102 also includes a tuned circuit comprising an inductance 103 and a capacitor 104 connected in parallel with each other between control electrode 101 and ground. In the illustrated embodiment, tube 102 is of the gated-beam type commercially available under the type designation 6BN6. Limiter tube 102 includes a cathode 105 connected to ground through an unbypassed biasing resistor 106. The limiter tube further includes a pair of accelerating electrodes 107 and 108 disposed on opposite sides of control electrode 101; the two accelerating electrodes are connected to each other and are connected to the B+ supply through a resistor 109, being bypassed to ground by a capacitor 110. Tube 102 further includes a second control electrode 111 and an anode or output electrode 112; the second control electrode is not utilized in operation of the limiter and may be connected to anode 112 as shown or to ground.

Anode 112 of limiter tube 102 is returned to B+ through a circuit comprising two anti-resonant circuits 115 and 116 connected in series with each other. The terminal of resonant circuit 115 connected to anode 112 is coupled to the electrical center of an inductance 117 through a coupling capacitor 118, and a capacitor 119 is connected in parallel with coil 117 to form an anti-resonant circuit tuned to the same frequency as circuit 115. Coil 117 is also inductively coupled to the inductance coil of tuned circuit 115. The opposite terminals of coils 117 are respectively connected to the two anodes 120 and 121 of a double diode 122. The cathode 123 of tube 122 associated with anode 121 is connected back to the electrical midpoint of coil 117 through a resistor 124, and the cathode 126 associated with anode 120 is returned to the same point through a resistor 127. Cathodes 123 and 126 are bypassed to ground by capacitors 129 and 130 respectively and are returned to a source of negative operating potential C— in control power supply 51 through two equal resistors 131 and 132 respectively. Tube 122 is thus incorporated in a conventional balanced frequency-discriminator circuit frequently used as a detector for frequency-modulated signals. In the present invention, however, the balanced frequency discriminator is used in a somewhat different manner than in conventional practice, as will be made more apparent in the operational description of the system included hereinafter.

The frequency-discrimination device comprising tube 122 forms a part of the first segregation network 35 (see Figure 1); network 35 also includes further means for distinguishing between desired and undesired output signals from limiter 34 on the basis of duration and duty cycle of the received signal. A pair of resistors 133 and 134 are connected in series with each other and with cathode 123 of tube 122, and a similar pair of resistors 135 and 136 are connected in series with each other and with cathode 126. The common terminal of resistors 133 and 134 is bypassed to the common terminal of resistors 135 and 136 by a capacitor 137; the other terminal of resistor 134 is bypassed to ground through a capacitor 138, whereas the corresponding terminal of resistor 136 is bypassed to ground through a capacitor 139. Resistors 133—136 and capacitors 137—139, together with resistors 131 and 132, constitute a pair of integrating networks for developing potentials indicative of the average amplitudes of the signals appearing at the cathodes of the frequency-discriminator rectifying-detector comprising tube 122.

Network 35 further includes a threshold device or amplifier comprising a double triode 140. The two cathodes 141 and 142 of tube 140 are grounded; the control electrode 143 associated with cathode 141 is connected to the common terminal of resistor 134 and capacitor 138, whereas the control electrode 144 associated with cathode 142 is similarly connected to the common terminal of resistor 136 and capacitor 139. The anode 145 of tube 140 associated with cathode 141 and control electrode 143 is returned to B+ through the operating coil 147 of the muting relay 37 (see Figure 1). Similarly, the other anode 148 of tube 140 is connected to the B+ supply through the operating coil 149 of the on-off relay 38 (Figure 1).

Tuned circuit 116 is incorporated in the second segregation network 36 which, as indicated in the description of Figure 1, is similar in construction to network 35. Network 36 comprises a second tuned circuit 150 coupled to a double diode 151 and to resonant circuit 116 in the same manner as in discriminator 35; the two cathodes of tube 151 are connected to a dual integrating network 152 which in turn controls operation of a threshold amplifier comprising a double triode 153. One of the anodes 154 of amplifier tube 153 is connected to the B+ supply through the operating coil 155 of the clockwise-motor-control relay 39, whereas the other output electrode 156 of tube 153 is returned to B+ through the operating coil 158 of the counter-clockwise-motor-control relay 40.

The basic operation of the control system receiver station illustrated in Figure 2 is similar to that described in connection with Figure 1; Figure 2, however, illustrates several featuers of the invention which provide for greatly enhanced effectiveness in plural-function-control system operation as compared with other possible embodiments. An acoustic signal impinging upon microphone 62 effectively varies the microphone capacitance and excites the three-stage amplifier comprising tubes 63, 81A, and 81B. The electrical signal variations provided by the microphone are first amplified in tube 63, the tuned output circuit 77, 78 of the tube providing for substantial attenuation of most frequency components outside of the selected acoustic frequency range of the system (38 to 41 kilocycles in the assumed example). The electrical signal from amplifier tube 63 is further amplified in tubes 81A and 81B and constitutes the input signal applied to limiter tube 102. Further frequency selection is provided by the parallel-resonant circuit 103, 104 in the input circuit of the limiter.

Limiter 34, comprising tube 102, performs two distinct functions. It operates as a limiting amplifier, providing an output signal of constant amplitude over a wide range of input signal amplitudes. The tube selected for this limiter must have an output electrode current vs. control electrode voltage characteristic comprising two control electrode voltage ranges of substantially zero transconductance separated by a control electrode voltage range of high transconductance, a characteristic best achieved by a gated-beam tube such as the 6BN6 but also attainable in other conventional devices such as the 6BE6 or 6BU8. With a tube and circuit exhibiting this characteristic, the limiter functions also as a harmonic generator and provides substantial output signals at the third and fifth harmonics of the input signal. The structure and operation of a harmonic generator of this type are described in detail in U.S. Patent No. 2,681,994 to Robert Adler, filed September 27, 1949, issued June 22, 1954, and assigned to the same assignee as the present invention. Accordingly, a detailed description of operation of the limiter circuit is unnecessary here. It is sufficient to indicate that the limiter develops an amplitude-limited signal having a frequency which is an integral multiple of the input signal frequency; in the illustrated embodiment, the third harmonic of the input signal frequency is utilized for reasons indicated hereinafter. Any other type of limiter may of course be substituted for the illustrated device, particularly where the discriminators of the system are constructed to operate at the fundamental frequency of the output signal from limiter 34. Moreover, it should be understood that one stage of the amplifier of circuit 31 may be constructed as a frequency multiplier, in which case circuit 34 may function only as a limiter.

The amplitude-limited signal from limiter 34 is supplied to the tuned circuits 115 and 116 of the discriminators included in networks 35 and 36 respectively. The two discriminator input circuits are preferably connected in series as illustrated; this is possible because they are tuned to substantially different frequencies and each represents a relatively low impedance at the resonant frequency of the other. In the illustrated system, as in Figure 1, four acoustic signals of different frequency are utilized for four different control functions; the frequencies selected, may, for example, be 38, 39, 40, and 41 kc. respectively. With these operating frequencies, parallel-resonant circuit 115 may be tuned to a frequency of 38.5 kc., the center frequency between the two lower-frequency signals, in which case resonant circuit 116 is tuned to 40.5 kc., the median for the two higher-frequency signals. Operation in this case is predicated upon use of the fundamental component of the output signal from limiter 34. Operation on the fundamental, however, presents difficult problems in feedback between the circuit elements, particularly the inductances, of discriminator devices 35 and 36 and the different stages of the input amplifier circuit, particularly the tuned circuit 77, 78 incorporated in the output circuit of amplifier tube 63. The possibility of such regeneration difficulty is apparent from the fact that the relatively low frequencies involved make magnetic shielding difficult and expensive and the further fact that amplification in the system must be extremely high in order to provide for use of relatively weak acoustic triggering signals. Consequently, in the preferred system illustrated resonant circuit 115 is tuned to 115.5 kc., the third harmonic of the median frequency for the two lower-frequency signals. Similarly, circuit 116 is constructed to have a resonant frequency of 121.5 kc., the third harmonic of the median for the two higher-frequency trigger signals.

In accordance with the usual construction of frequency discriminators, the resonant circuit comprising coil 117 and capacitor 119 is tuned to the same frequency (115.5 kc.) as resonant circuit 115 and the coils of the two circuits are disposed in mutual coupling relationship. Consequently, the discriminator rectifying-detector comprising the two tuned circuits, tube 122, coupling capacitor 118 and resistors 124 and 127 has an operating characteristic as illustrated by dash line 160 in Figure 3, in which the voltage appearing across cathodes 123 and 126 is plotted as a function of the frequency of the signal applied to tuned circuit 115 from limiter 34. Curve 160 is representative of the magnitude of that voltage; however, it should be understood that the polarity is arbitrarily selected. As drawn, the curve represents the potential of cathode 123 with respect to cathode 126; if cathode 123 had, instead, been chosen as potential reference, curve 160 would appear reversed. It will be noted that curve 160 is a plot of frequency vs. potential-output-level; curve 160 includes two frequency-displaced peaks, illustrated as occurring at 114 and 117 kilocycles, individually representing potentials of opposite polarity with respect to the potential represented by the curve at a frequency, 115.5 kilocycles in this instance, intermediate the frequencies represented by the peaks. Resistors 131 and 132, of substantially equal resistance are connected in series across the two cathodes 123 and 126, their common terminal being returned to the C— reference voltage. Half the discriminator output voltage, therefore, appears across each of these resistors. The voltage across resistor 131 is plotted in Figure 3 as a function of the frequency of the signal applied to the discriminator, being illustrated by solid line 161; its amplitude is approximately half that of the total discriminator output voltage and includes values both positive and negative with respect to the C— reference voltage to which the common terminal of resistors 131 and 132 is returned. The voltage across resistor 132 illustrated by dotted line 162, follows a characteristic essentially similar to that of curve 161 except that the polarity with respect to the bias voltage is reversed.

The circuit parameters for the discriminator circuits are so selected that the two peaks of each of voltage characteristic curves 160—162 are centered at 114 and 117 kcs. respectively, these frequencies being the third harmonics of the two acoustic frequencies (38 and 39 kcs.) employed to actuate this portion of the control system. In conventional use of the discriminator circuit as a detector for frequency-modulated signals, only the relatively linear portion of characteristic 160 centered about the median or resonant frequency of 115.5 kcs. would be employed. In the present instance, however, the effective operating range for the frequency discriminator is restricted to two narrow portions, each including one of the two peaks at 114 and 117 kcs. to enable the system to distinguish between these two frequencies and to discriminate against other frequencies outside the two operating ranges. For this reason, the two threshold amplifier sections coupled to cathodes 123 and 126 are biased to be normally cut off except when the input signal from the discriminator exceeds a predetermined amplitude. The cut-off level for the amplifier is indicated by dash line 163 in Figure 3. A somewhat higher amplitude, indicated in Figure 3 by line 164, is required to operate relays 37—40 (Figures 1 and 2), since a minimum current is required to actuate the relays. The requisite negative bias in the illustrated embodiment is provided by the connection of the common terminal of resistors 131 and 132 to the negative source C— of control power supply 51.

Under well-controlled environmental conditions, it is only necessary to distinguish between the components of the amplitude-limited signal from limiter 34 on the basis of frequency, in which case the threshold amplifier or amplitude-discriminator device comprising double triode 140 may be connected directly to resistors 131 and 132 without providing the intervening integrating network shown in the preferred embodiment. The control system may then be triggered, however, by extraneous ultrasonic signals having a frequency approximately equal to the selected acoustic operating frequencies or by noise at approximately 114 kc. or 117 kc. in the output from limiter 34. In a more normal environment, the system might thus be triggered into spurious operation by acoustic signals of very short duration produced by the jingling of coins or keys or from other sources. The system might also be falsely actuated by intermittent signals within the operating acoustic frequency ranges. In order to avoid this possibility of malfunction of the system and take advantage of the slow decay of the ultrasonic signal produced by the transmitter, the integrating network is utilized to average the output signal from the frequency discriminator comprising tube 122 over a predetermined period of time, preferably somewhat shorter than the time constant of the acoustic transmitter. By properly selecting the circuit parameters for the integrating network and the threshold or firing levels for the two sections of amplifier tube 140, segregation network 35 may be made responsive only to signals of predetermined minimum duration and duty cycle.

The effect of the integrating circuit is illustrated in Figure 4, in which solid-line curve 165 represents the output voltage of the frequency discriminator as a function of time for an amplitude-limited signal at 114 kc. corresponding to a received actuating signal of 38 kc. from the system transmitter. Dash-line curve 166, on the other hand, indicates a typical noise signal which might occur over a similar time interval; the noise signal may vary substantially in frequency and/or amplitude during that period and, as a consequence, the output voltage from the frequency discriminator fluctuates considerably. The firing level for the threshold amplifier comprising tube 140 is indicated by dash-line 164; as indicated by the shaded areas 167 and 168, the noise signal would actuate the amplifier section comprising electrodes 141, 143 and 145 (Figure 2), even in the absence of a desired actuating signal from the transmitter, if no integrating network were interposed between tube 140 and the output resistors 131 and 132 of the frequency discriminator.

The integrated signal impressed upon control electrode 143 of tube 140 in response to input signal 165 is illustrated by dash-line 169. As indicated, control electrode 143 is driven to a potential substantially above cut-off level 164 for a period of time substantially equal to the period of conduction which would be provided by signal 165 if no integrating network were present, although the period of conduction for the amplifier is somewhat delayed. The periods of spurious actuation indicated by shaded areas 167 and 168, however, are completely eliminated by the integrating circuit, as shown by curve 170, which represents the integrated voltage applied to control electrode 143 as a result of the noise-induced output voltage 166 from the frequency discriminator. It is thus apparent that the integration circuit of segregation network 35 renders the system responsive only to signals of predetermined minimum duration as indicated by the time period 171 in Figure 4.

At the same time, the output signal from the frequency discrimination portion of circuit 35 must have a minimum duty cycle in order to trigger the system. For a circuit having the characteristics illustrated in Figure 4, the minimum duty cycle for rapidly fluctuating signals from the discriminator is determined by the relative amplitudes of maximum limiter output level 165 and relay actuation level 164 and is equal to approximately 65%. That is, a fluctuating signal of maximum amplitude must be present 65% of the time during a period at least equal to the time constant of the integrating circuit, generally indicated at 172. It has been found that a minimum duty cycle of 50%, determined by establishing relay actuation level 164 at at least 50% of limiter 165, should be maintained to provide adequate noise immunity.

It is thus apparent that the first section of tube 140 comprising cathode 141, control electrode 143 and anode 145 is rendered conductive only when the amplitude-limited signal applied to circuit 115 from limiter 34 is sufficiently close to the frequency corresponding to the selected acoustic operating frequency (38 kc.) and has a predetermined minimum duration and duty cycle. Consequently, a control potential or current is applied to operating coil 147 of relay 37 only when these conditions obtain, so that muting relay 37 is actuated between its different operating conditions only in response to the desired acoustic signal from transmitter 30 (Figure 1). Similarly, the other section of amplifier tube 140 comprising electrodes 142, 144, and 148 (Figure 2) is rendered conductive only in response to a received acoustic signal meeting the same requirements as to duration and duty cycle and having a frequency very nearly equal to 39 kc., so that coil 149 of on-off relay 38 is actuated only at the desired times. Segregation network 36 functions in exactly the same manner to actuate the two motor-control relays 39 and 40 only in response to signals of predetermined duration and duty cycle having frequencies approximately equal to 40 and 41 kc. respectively. In this connection, it should again be noted that the two segregation circuits 35 and 36 may be identical in construction except that the resonant frequency for circuits 116 and 150 is made equal to 121.5 kc. instead of 115.5 kc.

One problem presented in the circuit illustrated in Figure 2 is that of imbalance between the output signals developed by the two frequency discriminator circuits, which is generally attributable to the plate-to-ground capacitance of limiter tube 102. This lack of balance between the two frequency discriminators can be substantial and can present a severe problem in the control system receiver. It has been discovered, as described and claimed in the copending application of Robert Adler and John G. Spracklen, Serial No. 632,124, filed January 2, 1957, for Frequency Discriminating System, now U.S. Patent No. 2,838,668, issued June 10, 1958, and assigned to the same assignee as the present application, that the discriminators of networks 35 and 36 can be constructed to effectively neutralize this capacitive effect by suitable positioning of the inductance coils of the frequency discriminator tuned circuits. In essence, this is accomplished by locating the coils of resonant circuits 115 and 116 relatively close to each other and with connections of proper polarity so that the mutual inductance linking the two frequency discriminators effectively compensates for the plate capacitance of the limiter tube. In one satisfactory construction employed for this purpose, the four coils of the discriminator circuits are all aligned in a single row, the two inside coils constituting the inductances of circuits 115 and 116. With this arrangement, the coil spacing may be adjusted to provide the necessary controlled coupling and, if there is insufficient space available in the control receiver chassis to avoid overcoupling, excess mutual coupling can be compensated by adding a relatively small capacitor between limiter tube anode 112 and ground.

Figure 5:
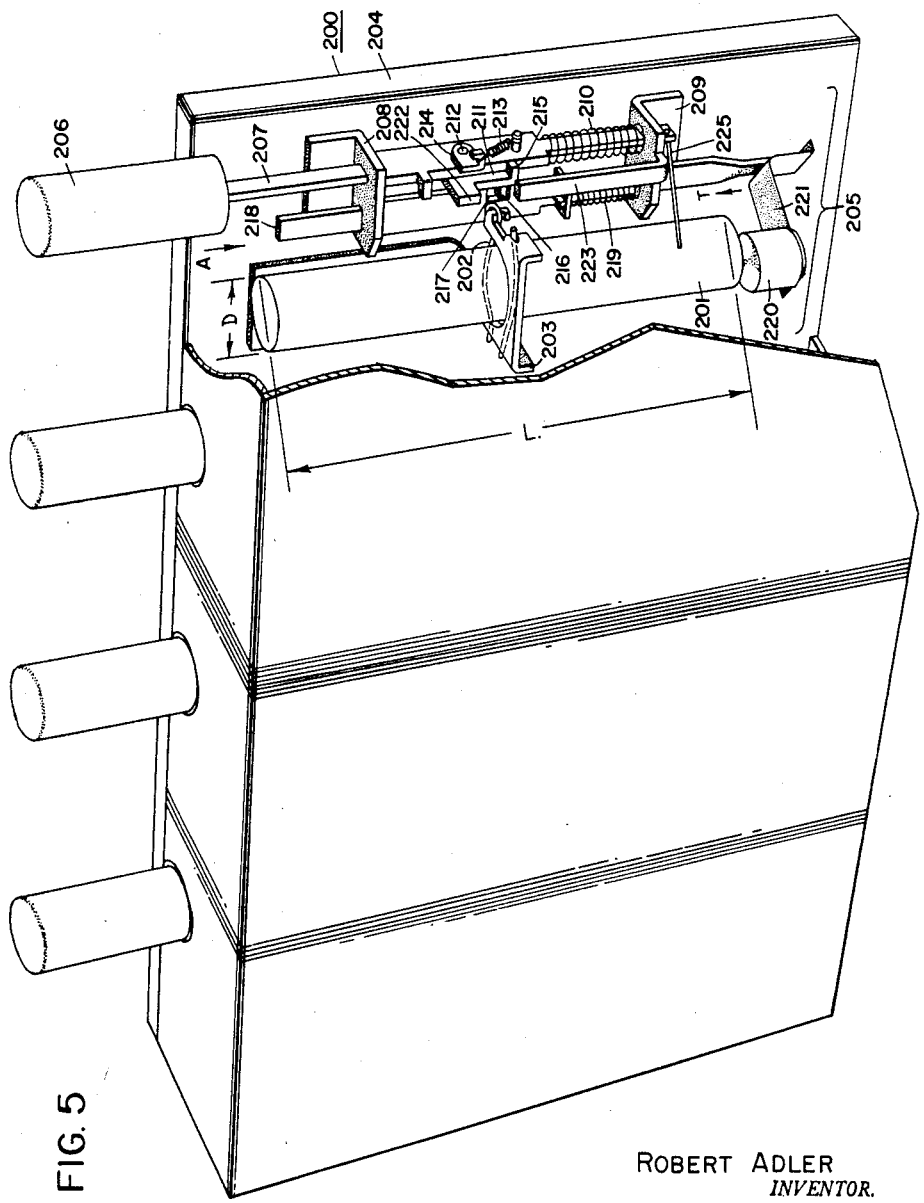
Figure 5 is a perspective view of a transmitter unit for a remote control system constructed in accordance with the invention.

Of course, the remote control system is only as good as its transmitter, and it has been found that complexity and delicacy of construction are highly undesirable in this portion of the system. A preferred form of transmitter 200 for use in the remote control system of the invention is illustrated in Figure 5, in which complete details are given for only one section 205 of the transmitting apparatus inasmuch as the four sections required to actuate the systems illustrated in Figures 1 and 2 may be essentially identical except for their resonant frequencies.

Acoustic transmitter section 205 comprises a vibrator element or rod 201 of homogeneous material having an overall length L equal to one-half wavelength of sound in that material at a predetermined acoustic operating frequency. Stated differently, the resonant frequency for vibrator rod 201 is approximately equal to the velocity of sound in the rod material divided by twice the length L. The diameter D of vibrator rod 201 is preferably made approximately equal to one wavelength at the resonant frequency in air, to provide for good efficiency in radiating the acoustic signal. Rod 201 is supported by a spring clamp 202 affixed to a bracket 203; spring clamp 202 should be located at the midpoint of the rod to permit longitudinal-mode vibration of the rod. This support including spring clamp 202 is described and claimed in the copending application of Ole Wold, Serial No. 645,310, filed March 11, 1957, for Ultrasonic Generator, now U.S. Patent No. 2,821,956, issued February 5, 1958, and assigned to the present assignee. Bracket 203 is suitably affixed to a support base 204.

Vibrator element 201 constitutes the resonant transmitting element for the first transmitter section 205; the complete transmitter 200 includes three other essentially similar transmitter sections which differ from section 205 only in the length of their individual vibrator elements. Provision is thus made for the four different acoustic operating frequencies necessary for actuating the control systems illustrated in Figures 1 and 2.

Transmitter section 205 further includes a pushbutton 206 affixed to an operating rod 207 which is slidably supported in a pair of spaced brackets 208 and 209. A bias spring 210 is mounted on operating rod 207 to urge the pushbutton operating rod toward its normal or inactive position. A cam lever 211 is pivotally mounted on one side of operating rod 207 by means of a pin 212 and is biased for rotation in a counterclockwise direction by a spring 213 connected between a fixed point on operating rod 207 and an extension 214 of the cam lever. A stop element 215 mounted on lever 211 engages operating rod 207 to maintain the cam lever in its normal inoperative position as illustrated. An extension 216 of cam lever 211 engages a slot 217 in a trip rod 218 which is slidably mounted in brackets 208 and 209 for movement parallel to operating rod 207; trip rod 218 is biased toward its normal inoperative position, as illustrated, by a spring 219. One end of rod 218 extends beyond bracket 209 and is employed to support a striking element in the form of a hammer 220, hammer 220 being mounted on a resilient support bracket 221 affixed to the trip rod. A damping element 225 is affixed to rod 207 and extends into contact with vibrator element 201 at the end of the vibrator element adjacent hammer 220; the damping element may, for example, comprise a length of resilient steel wire. Certain details of this striking mechanism are described and claimed in the copending application of Robert C. Ehlers and Clarence W. Wandrey, Serial No. 645,091, filed March 11, 1957, for Ultrasonic Transmitter, now U.S. Patent No. 2,821,955, issued February 4, 1958, and assigned to the present assignee.

To actuate transmitter section 205, pushbutton 206 is depressed in the direction indicated by arrow A. As the operating shaft 207 moves in this direction, cam lever 211 moves with it and the cam lever extension 216, by its engagement in slot 217, forces trip rod 218 in the same direction. When operating rod 207 has moved through a predetermined distance, an extension 222 on cam lever 211 engages a stop element 223 affixed to bracket 209.

Consequently, continued movement of operating rod 207 in the direction indicated by arrow A causes the cam lever to rotate in a clockwise direction and releases cam extension 216 from slot 217 in trip rod 218. The trip rod moves rapidly in the direction indicated by arrow T, thereby impinging hammer 220 upon the end of vibrator rod 201 and exciting the vibrator rod into longitudinal mode vibration.

Amplitude of vibration in rod 201 decays exponentially in essentially the same manner as an electrical signal in a shock-excited resonant circuit. The time constant for the resonator rod is dependent upon the rate at which the vibratory energy stored in the rod is radiated into the air and upon the internal damping of the rod. These two factors, in turn, are functions of the material from which the vibrator rod is constructed. An extremely wide variety of materials may be employed for this purpose, including metals, glass, ceramics, and others. In order to achieve a signal of useful amplitude over a period of substantial duration, it is desirable to select a material which exhibits relatively low internal damping at the desired operating frequency. A typical example of such material is aluminum, for which the time constant at a frequency of 40 kc. is of the order of 0.3 second and which exhibits a Q of the order of 35,000. The length of the vibrator rod, if made of aluminum, is relatively small at the suggested operating frequencies in the 40 kc. range, being only approximately 2.5 inches.

The amplitude of the signal from transmitter section 205, as it impinges upon the microphone 62 (Figure 2) is inversely proportional to the distance separating the transmitter from the receiver portion of the control system. Obstructions in the direct line of sight, standing wave patterns caused by reflections and other factors may contribute additional attenuation. Consequently, a transmitter designed to provide an acoustic signal of sufficient amplitude to actuate the reciver reliably from a distance of 30 feet, for example, may continue to develop an output signal of sufficient strength to actuate the control system over a much longer time interval than desired when operated at a distance of only 10 feet from the receiver. In the case of the ratchet or step-type relays employed for the on-off and muting functions of the system, this effective extension of duration of the acoustic signal may have little or no adverse effect. With respect to the instantaneous-contact tuning control relays, however, it may easily cause the receiver to overshoot the desired tuning condition, thus seriously impairing the effectiveness of the control system. Consequently, it is desirable to include some means for damping the vibrator element of the transmitter under control of the transmitter operator. This damping effect is readily achieved by means of damping element 225. When pushbutton 206 is depressed to actuate transmitter section 205, the damper element is removed from contact with vibrator rod 201 and consequently does not interfere with vibration of the resonant rod. As soon as pushbutton 206 is released, however, and returns to its normal position, damping element 225 again contacts vibrator rod 201 and effectively damps the vibrator so that it cannot continue to radiate an acoustic signal. Overshooting in the tuning controls is thus effectively avoided.

The longitudinal-mode vibratory system of the transmitter of Figure 5 provides marked advantages as compared to other types of acoustic signal generators. For example, prismatic bars subjected to vibration in the fundamental flexure mode could be employed. For a device of this type, however, it is necessary to utilize a vibrator constructed from material much heavier than aluminum since the rate of energy loss to the surrounding air is much higher for a flexure mode. Thus there would be no saving in weight, even though the flexure-mode device could be made substantially smaller in size. High-carbon steel could perhaps provide satisfactory performance, but it would introduce a substantial disadvantage due to the fact that the resonant frequency of a steel bar would be a function of the drawing temperature employed in fabricating the bar. In addition, the frequency of a prismatic flexure bar is linearly proportional to the thickness of the bar and inversely proportional to the square of its length. Consequently, to obtain a frequency tolerance of one part in one thousand, a bar of approximately one inch length and one-half inch thickness would have to be machined to approximately ±.00025 inch tolerances in both length and thickness. A longitudinal-mode vibrator such as rod 201, on the other hand, has a resonant frequency which depends only on its length, being inversely proportional thereto. Consequently, the resonant frequency of a 2.5 inch rod machined to ±.0025 inch, a ten times wider tolerance than the one mentioned above, is accurate to within one part in one thousand. It would be much too expensive to maintain the tolerances indicated for he flexure mode resonator, so that individual adjustment of the frequency of each resonator would be necessary; this is not usually necessary with longitudinal-mode vibrators. Considerations similar to those just given in connection with prismatic bars apply to other shapes such as bells, chimes and the like which utilize flexure modes.

Figure 6:
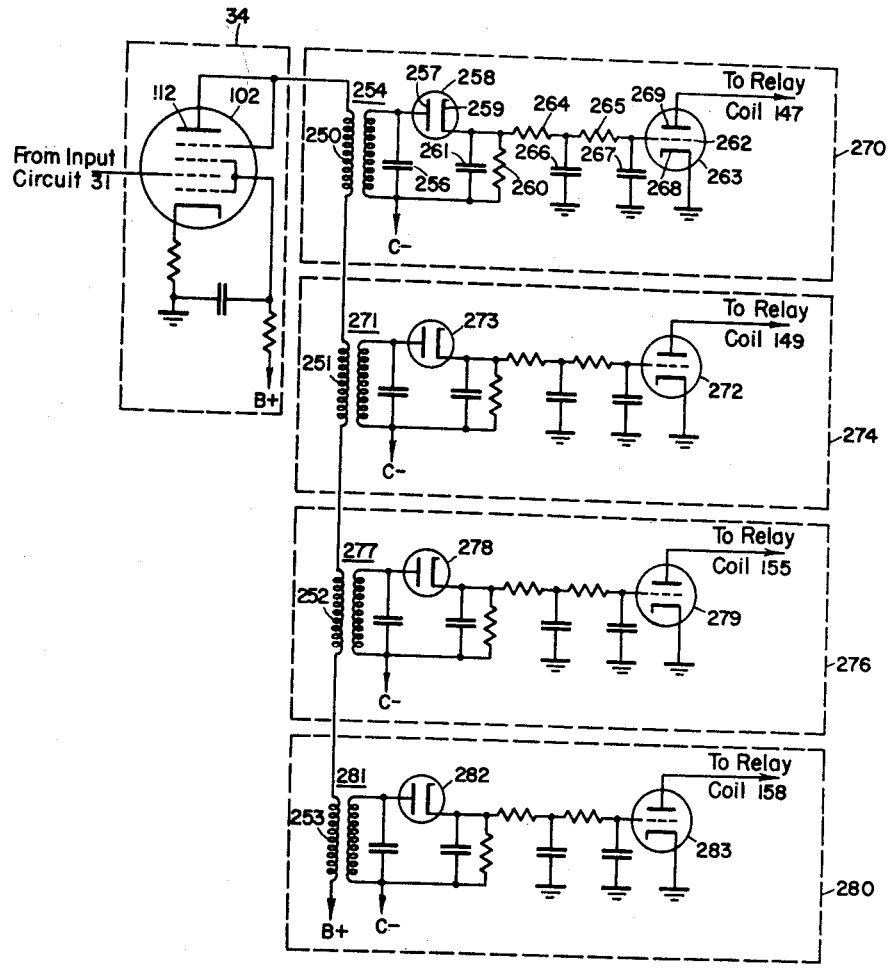
Figure 6 is a schematic diagram of a portion of another embodiment of the invention.

Figure 6 illustrates the segregation network sections of another embodiment of the invention which is otherwise similar to that illustrated in Figure 2. In the embodiment of Figure 6, anode 112 of tube 102 in limiter 34 is connected to the B+ supply through four series-connected coils 250, 251, 252, and 253. Coil 250 forms the primary winding of a transformer 254 having a secondary winding 255 which, with a capacitor 256, forms a parallel-resonant circuit tuned to a frequency of 114 kcs. One terminal of coil 255 is connected to the anode 257 of a diode 258, the cathode 259 of the diode being returned to the other terminal of coil 255 through a D.C. load resistor 260 which is shunted by a capacitor 261. The bottom terminal of coil 255 is also returned to the negative D.C. voltage supply C—. Cathode 259 of diode 258 is also connected to the control electrode 262 of an amplitude discriminator or threshold amplifier tube 263 through an integrating circuit comprising two resistors 264 and 265, connected in series between cathode 259 and control electrode 262, and a pair of shunt capacitors 266 and 267. The cathode 268 of tube 263 is grounded and the anode 269 is connected to muting relay coil 147 (see Figure 2). Tuned-secondary transformer 254, diode 258, tube 263, and their associated circuitry comprise a frequency and amplitude segregation network indicated by dash outline 270.

Coil 251 constitutes the primary winding of a tuned-secondary transformer 271 which is coupled to a threshold amplifier comprising a tube 272, by means of a diode 273 and an integrating circuit, thereby forming a segregation network 274 which is essentially similar to circuit 270. The embodiment of Figure 6 also includes a third similar amplitude and frequency segregation circuit 276 including coil 252 as the primary winding of a tuned-secondary transformer 277, a diode 278, and a suitable integrating circuit coupling diode 278 to a threshold amplifier tube 279. A fourth segregation network 280 is included in the apparatus of Figure 6; discriminator 280 is essentially similar to devices 270, 274, and 276. Network 280 includes a tuned-secondary transformer 281, a diode 282, and an integrating circuit connecting diode 282 to the control electrode of a threshold amplifier tube 283.

In many respects, operation of segregation circuits 270, 274, 276 and 280 is essentially similar to that of circuits 35 and 36 of Figure 2. The secondary windings of transformers 254, 271, 277, and 281 are tuned to 114, 117, 120, and 123 kc. respectively to provide for selection between the four different third-harmonic signals supplied from limiter 34. In each instance, the signal is rectified by the diode in the segregation circuit, integrated, and applied to the threshold amplifier tube, Tubes 263, 272, 279 and 283 are each normally biased beyond cut-off by means of the connection of their control electrodes to negative bias source C— and are rendered conductive only when a signal within a limited frequency range is applied to the tuned transformer secondary rectified, integrated, and supplied to the control electrode. Like the embodiment of Figure 2, therefore, the apparatus of Figure 5 applies a control signal to the individual relay coils only when the receiver is triggered by an acoustic signal within a limited frequency range and having a predetermined minimum duration and duty cycle. The circuit of Figure 6 is somewhat less noise-immune than that of Figure 2, since any signal within the overall operating range of the segregation circuits 270, 274, 276, and 280 tends to produce a control signal of the correct polarity to render the threshold amplifier tubes conductive, whereas in the frequency discriminator circuits of Figure 2 noise having a relatively uniform frequency distribution produces no control potential at the threshold or amplitude-discrimination tubes, thereby affording additional protection against spurious operation. In addition, because the frequency discriminator devices of Figure 2 each utilize two tuned circuits, they are, generally speaking, somewhat more frequency selective.

Of course, other types of acoustic transmitter apparatus can be employed in conjunction with the receiver control systems of Figures 1, 2 and 6 and the transmitter of Figure 5 may be employed in other acoustic systems, but the two portions of the control system in combination complement each other to form a highly efficient and relatively inexpensive control system. The number of transmitter sections 205 required is of course dependent upon the number of control functions provided for in the receiver system. In this connection, it should be noted that additional segregation devices such as networks 35 and 36 (Figures 1 and 2) or circuits 270, 274, 276 and 280 (Figure 6) may be added to the control system to permit regulation of other electrical circuits and, similarly, additional transmitter sections corresponding to section 205 (Figure 5) may be added to the transmitter unit to actuate the additional segregation devices. By the same token, if it is desired to control fewer electrical circuits, the remote control system may be correspondingly simplified as by eliminating segregation network 36 (Figures 1 and 2) or devices 276 and 280 (Figure 6) in a system in which only two electrical circuits are to be controlled. A corresponding reduction in transmitter sections is of course made possible in the simpler control system. The control system is thus extremely flexible with respect to the number of electrical circuits it may be utilized to actuate.

The control system of the invention permits accurate and effective regulation of any number of electrical circuits without requiring substantial modification of the device in which those circuits are incorporated. The system is essentially immune to false actuation under normal operating circumstances and is quite simple and inexpensive in construction both at the transmitter and receiver terminals of the system.

While particular embodiments of the present invention have been shown and described, it is apparent that changes and modifications may be made without departing from the invention in its broader aspects. The aim of the appended claims, therefore, is to cover all such changes and modifications as fall within the true spirit and scope of the invention.

I claim:
1. In a remote control system for selectively initiating either one of a pair of different control functions of an apparatus, the combination comprising: control signal receiver means coupled to said apparatus and responsive to either one of a pair of airborne ultrasonic compressional-wave signals each of a different predetermined frequency for developing one of a corresponding pair of individual electrical signals; a frequency-discriminating rectifier-detector included within said receiver means and having a signal response characteristic including a pair of distinct frequency peaks individually harmonically related to the said respective different frequencies; first and second switch means independently responsive to different signals individually at respective ones of said pair of frequency peaks for initiating respective different ones of said control functions; a remotely located transmitter comprising a pair of elongated longitudinal-mode vibrators each having a different physical length respectively equal to one-half wavelength in the vibrator at a different one of said predetermined frequencies; and manually-operable means included in said transmitter for selectively exciting said vibrators into longitudinal-mode vibration.

2. A remote control system as defined in claim 1 in which said signal response characteristic constitutes a frequency vs. potential-output-level curve comprising two frequency-displaced peaks individually representing potentials of opposite polarity with respect to the potential represented by said curve at a frequency intermediate the frequencies represented by said peaks.

3. A remote control system as defined in claim 1 in which said longitudinal-mode vibrators each have a diameter approximately equal to one wavelength in air at said different frequencies.

References Cited in the file of this patent

UNITED STATES PATENTS

| | | |
|---|---|---|
| 2,138,613 | Pruden | Nov. 29, 1938 |
| 2,293,166 | Olson | Aug. 18, 1942 |
| 2,509,345 | Howell et al. | May 30, 1950 |
| 2,554,329 | Hammond | May 22, 1951 |
| 2,604,518 | Oliver | July 22, 1952 |
| 2,611,031 | Appert | Sept. 16, 1952 |
| 2,695,001 | Andrews et al. | Nov. 23, 1954 |
| 2,739,273 | Andrews et al. | Mar. 20, 1956 |